United States Patent Office 3,461,133
Patented Aug. 12, 1969

3,461,133
THIOPARABANIC ACID DERIVATIVES
Paul J. Stoffel, St. Louis, Mo., assignor to Monsanto Company, St. Louis, Mo., a corporation of Delaware
No Drawing. Filed Sept. 20, 1965, Ser. No. 488,746
Int. Cl. C07d *49/30;* A01n *9/22*
U.S. Cl. 260—309.5                           7 Claims

---

ABSTRACT OF THE DISCLOSURE

Compounds of the formula

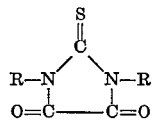

wherein R is selected from the class of aliphatic hydrocarbon consisting of alkyl having up to 12 carbon atoms, alkenyl having up to 12 carbon atoms, alkynyl having up to 12 carbon atoms, and the said hydrocarbon moieties containing substituents selected from the group consisting of chloro, cyano and alkoxy wherein the alkyl moiety has up to 4 carbon atoms, have utility as phytotoxicants.

---

This invention relates to novel compounds with significant phytotoxic properties. More specifically, the invention relates to derivatives of thioparabanic acids useful in the control of unwanted vegetation.

The new compounds have the structure

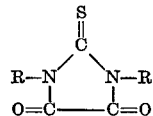

wherein R is selected from the class of aliphatic hydrocarbon consisting of alkyl of up 12 carbon atoms, alkenyl of up to 12 carbon atoms, alkynyl of up to 12 carbon atoms and the said aliphatic hydrocarbon having substituents of the group consisting of chloro, cyano and alkoxy wherein the alkoxy moiety has up to 4 carbon atoms.

The novel compounds are prepared from the thioureas having the described R substituents on the nitrogen atoms and oxalyl chloride. The reaction may be effected at reflux temperatures with the reactants dissolved or suspended in aromatic hydrocarbon, such as benzene, toluene and xylene. The product formed in solution can be precipitated by the addition of an aliphatic hydrocarbon, such as hexane and heptane. The substituted thioureas are dissolved in the solvent medium and a molar quantity of oxalyl chloride is added thereto at a rate which permits a rapid but controlled reaction. During the reaction hydrogen chloride is produced and the reaction is continued until evolution of HCl subsides.

Additional details of the preparation of the new compounds are set forth in the following examples:

EXAMPLE 1

A glass flask provided with a reflux condenser was charged with 100 ml. of benzene and 13.2 grams of N,N'-diethyl thiourea. Oxalyl chloride was gradually added while refluxing the reaction mixture. Hydrogen chloride was evolved during the reaction. When the evolution of HCl subsided the dissolved product was precipitated by adding 250 ml. of hexane. The precipitate was recrystallized from methanol to recover a yellow crystalline product (M.P. 99.5 to 100.3° C.) having the formula

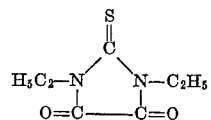

EXAMPLE 2

N,N'-diisopropyl-2-thiourea was dissolved in toluene and refluxed four hours with gradual addition of a stoichiometric quantity of oxalyl chloride. The crystalline product (M.P. 131.0 to 131.7° C.) was recrystallized from methanol and identified as N,N'-diisopropyl thioparabanic acid.

EXAMPLE 3

A thioparabanic acid with two 2-ethylhexyl substituents was prepared by dissolving N,N'-di(2-ethylhexyl)thiourea in xylene and gradually adding to the refluxing solution an excess of oxalyl chloride. The product recovered was purified by recrystallization.

EXAMPLE 4

N,N'-didodecyl thioparabanic acid was prepared by refluxing an N,N'-didodecyl thiourea in a benzene solution and gradually charging the reaction mixture with an equimolar quantity of oxalyl chloride. The desired product was recovered from the reaction mixture.

EXAMPLE 5

Using the procedure of Example 1, oxalyl chloride was reacted with N,N'-diallyl thiourea and the product was identified as that having the formula

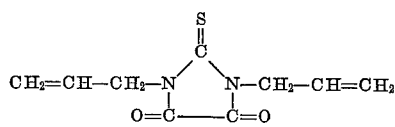

EXAMPLE 6

N,N'-di(propynyl)thioparabanic acid was prepared by heating at reflux temperature a mixture of oxalyl chloride and N,N'-di(propynyl)thiourea in xylene solution.

EXAMPLE 7

By heating in benzene at the reflux temperature one mole of N,N'-di(2-cyanoethyl)thiourea and one mole of oxalyl chloride a crystalline product was prepared having the formula

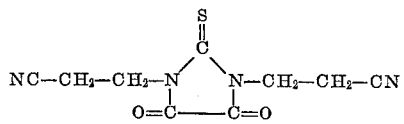

EXAMPLE 8

One mole of N,N'-di(2-chloroethyl)thiourea and two moles of oxalyl chloride were reacted by heating at reflux in a toluene solution. The product recovered was identified as N,N'-di(2-chloroethyl)thioparabanic acid.

EXAMPLE 9

A benzene solution of N,N'-di(methoxypropyl))thiourea was treated with oxalyl chloride until one mole of oxalyl chloride had been reached. The product precipitated by the addition of hexane was identified as N,N'-di(methoxypropyl)thioparabanic acid.

The above described compounds are useful in inhibiting unwanted vegetation. The compounds may be applied to the vegetation directly or may be incorporated in the soil or other growing medium. Frequently it is desirable to modify the physical properties by formulation procedure.

The solid formulations, frequently referred to as "dusts" may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus, hydroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, activated charcoal, precipitated calcium carbonate and colloidal silica. These diluents may comprise a substantial portion, for example 50 to 98 percent by weight of the entire formulation as applied to plant or soil. More concentrated herbicides will require dilution by the user in order to properly condition the soil for the most effective usage. The concentrated solid phytotoxic formulations can be used with less danger if they are mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. Often the substituted parabanic acids are only limitedly soluble in water and therefore aqueous formulations will necessarily be dispersions of minute drops of the water-insoluble substances in suspension in an aqueous medium. The water-insoluble substituted parabanic acids of this invention may first be dissolved in a suitable organic solvent and the organic solution of the active ingredient then incorporated in water or in any aqueous medium to produce a heterogeneous dispersion of the active ingredient in water.

One composition which aids in the effectivity of the phytotoxic component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps, such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent by weight and frequently as low as 0.05 percent. In general, concentrations of from 0.5 to 5 percent by weight are found to be optimum.

Many of the formulations are benefited by the incorporation of organic solvents for the active compounds, such as the water-immiscible organic alcohols, ketones and hydrocarbons, for example benzene, methylethyl ketone, kerosene, and chlorinated hydrocarbons. The proportions of such organic liquid additives will depend upon the solubility properties of the active ingredient and may require as little as one percent or as much as twenty percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions containing optimum proportions of dispersing agents and active component will be prepared. The solid or liquid formulations are preferably applied by mechanical equipment involving spraying or spreading the formulation on soil or plant surfaces being treated. For this purpose, readily flowable compositions are required, either in liquid or solid in physical state. Thus, a critical aspect of the invention is the fluent carrier without which the optimum herbicidal effects cannot be achieved.

Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

The novel phytotoxic compounds are applied to the vegetation or to the soil in which plants are growing or will be planted. Effective compositions will be applied to the extent of one to 25 pounds per acre. For contact procedures solutions or aqueous dispersions of .01 to 0.5 percent will be useful and, when applied to vegetation until the saturation point is reached, will attain a phytotoxic concentration on the foliage.

Although the invention is described with respect to specific examples and modifications, it is not intended that the details thereof are limitations on the scope of the invention except to the extent incorporated in the following claims.

What is claimed is:

1. Compound of the formula

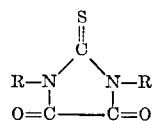

wherein R is selected from the group consisting of alkenyl of not more than 12 carbon atoms, alkynyl of not more than 12 carbon atoms, alkyl of not more than 12 carbon atoms containing substituents selected from the group consisting of chlorine, cyano and alkoxy of not more than 4 carbon atoms, alkenyl of not more than 12 carbon atoms containing substituents selected from the group consisting of chlorine, cyano and alkoxy of not more than 4 carbon atoms, alkynyl of not more than 12 carbon atoms containing substituents selected from the group consisting of chlorine, cyano and alkoxy of not more than 4 carbon atoms.

2. N,N'-(dialkynyl)thioparabanic acid wherein each alkynyl is of not more than 12 carbon atoms.

3. N,N'-dialkenyl thioparabanic acid wherein the alkenyl has up to 12 carbon atoms.

4. N,N'-(diallyl)thioparabanic acid.

5. N,N'-di(2-chloroethyl)thioparabanic acid.
6. N,N'-di(2-cyanoethyl)thioparabanic acid.
7. N,N'-di(methoxypropyl)thioparabanic acid.

References Cited

Beilstein's Handbuch der Organischen Chemie, 4th ed., vol. 24, pp. 460–2, Berlin, Springer, 1936.

Beilstein's Handbuch der Organischen Chemie, 4th ed., vol. 24, 1st Suppl., pp. 406–8, Berlin, Springer, 1936.

Stoffel, Jour. Org. Chem., vol. 29, pp. 2794–6 (Sept. 1964), distributed by Amer. Chem. Soc., Sept. 11, 1964.

HENRY R. JILES, Primary Examiner

NATALIE TROUSOF, Assistant Examiner

U.S. Cl. X.R.

71—92; 260—465, 552